United States Patent [19]

Noro et al.

[11] Patent Number: 5,290,861
[45] Date of Patent: Mar. 1, 1994

[54] THERMOPLASTIC RESIN COMPOSITION

[75] Inventors: Masahiko Noro; Munehiro Mitsui; Kazuyoshi Nakazawa; Tateki Furuyama, all of Tokyo, Japan

[73] Assignee: Japan Synthetic Rubber Co., Ltd., Tokyo, Japan

[21] Appl. No.: 980,095

[22] Filed: Nov. 23, 1992

Related U.S. Application Data

[63] Continuation of Ser. No. 753,965, Sep. 3, 1991, abandoned.

[30] Foreign Application Priority Data

Sep. 3, 1990 [JP] Japan ............... 2-232661

[51] Int. Cl.⁵ ............ C08L 55/02; C08L 51/04; C08L 67/02
[52] U.S. Cl. ............................ 525/67; 525/64; 525/439
[58] Field of Search ........... 525/64, 67, 439, 133, 525/146

[56] References Cited

U.S. PATENT DOCUMENTS

| | | | |
|---|---|---|---|
| 3,644,574 | 2/1972 | Jackson, Jr. et al. | 260/873 |
| 4,780,506 | 10/1988 | Wefer | 525/67 |
| 4,877,835 | 10/1989 | Tsuda et al. | 525/67 |
| 5,043,200 | 8/1991 | Kobayashi | 525/67 |

FOREIGN PATENT DOCUMENTS

| | | | |
|---|---|---|---|
| 135493 | 3/1985 | European Pat. Off. | |
| 1-32660 | 5/1989 | Japan | 525/67 |
| 1-52148 | 6/1989 | Japan | 525/67 |
| 1595039 | 8/1981 | United Kingdom | |

OTHER PUBLICATIONS

Japanese Patent Abstracts of JP03007752; Jan. 14, 1991.

Primary Examiner—David Buttner
Attorney, Agent, or Firm—Oliff & Berridge

[57] ABSTRACT

A thermoplastic resin composition comprising (A) 75 to 99.8% by weight of a rubber-modified styrene thermoplastic resin, (B) 0.1 to 15% by weight of an aromatic polyester having an intrinsic viscosity in the range of 0.2 to 1.5 dl/g, and (C) 0.1 to 10% by weight of an aromatic polycarbonate. The resin composition provides a painted surface with a superior appearance when a paint is applied on its surface, while maintaining its good fluidity, high impact resistance, and excellent molding heat stability. It can be applied with particular advantage to bodies or chassis of automobiles and the like onto which a paint is coated.

1 Claim, No Drawings

THERMOPLASTIC RESIN COMPOSITION

This is a continuation of application Ser. No. 07/753,965 filed Sep. 3, 1991, now abandoned.

BACKGROUND OF THE INVENTION

1. Field of the Invention:

The present invention relates to a thermoplastic resin composition comprising a major amount of a rubber-modified styrene thermoplastic resin, a small amount of an aromatic polyester with a specific intrinsic viscosity, and a small amount of an aromatic polycarbonate. The thermoplastic resin composition possesses a high impact resistance and provides a painted surface with a superior appearance when a paint is applied on its surface.

2. Description of the Background Art

A rubber modified styrene thermoplastic resin is light in weight and can excellently be processed or molded. A secondary processing such as painting and galvanization can easily be applied to the molded surface. Because of these reasons, the resin is abundantly used for bodies or chassis of automobiles and the like. A rubber modified styrene thermoplastic resin, however, is unstable against organic solvents used for paints and produces deficiencies on the painted surfaces after finishing, such as crazing and very fine cracks leading to lack of glossiness, due to residual stresses created during the molding.

A method known in the art to solve the problem and to improve the external appearance of the painted surfaces is to use a large amount of monomers having polar groups, e.g. cyano compounds, for producing rubber modified styrene thermoplastic resins. Even though the method can improve the external appearance of the painted surfaces, moldability, processability, and molding heat stability of the resin are greatly impaired. Adhesion of the painted film to the substrate also decreases.

Thus, the improvement in external appearances of the painted surfaces involved the problem of worsening the intrinsic properties of the resin, such as superior moldability, processability, heat stability, and the like. They are inherently incompatible with each other. Conventional technologies could not find an adequate solution to the problem.

The present inventors have undertaken extensive studies in order to solve this problem, and found that incorporation of a small amount of aromatic polyester with a specific intrinsic viscosity and an aromatic polycarbonate could improve both the painted surface appearance and the impact resistance of a rubber modified styrene thermoplastic resin.

SUMMARY OF THE INVENTION

This invention provides a thermoplastic resin composition comprising:

(A) 75 to 99.8% by weight of a rubber-modified styrene thermoplastic resin, (B) 0.1 to 15% by weight of an aromatic polyester having an intrinsic viscosity in the range of 0.2 to 1.5 dl/g, and (C) 0.1 to 10% by weight of an aromatic polycarbonate, the composition containing no α-methylstyrene or less than 10% by weight of α-methylstyrene based on the amount of said rubber-modified styrene thermoplastic resin.

Other and further objects, features and advantages of the invention will appear more fully from the following description.

DETAILED DESCRIPTION OF THE INVENTION AND PREFERRED EMBODIMENTS (A) Rubber-modified styrene thermoplastic resin:

Component (A) used in the present invention is (1) a rubber-modified styrene polymer or (2) a mixture of a rubber-modified styrene polymer and a styrene polymer which is not rubber-modified. They are prepared by incorporating a rubbery polymer into a specific type of styrene polymer in order to provide the latter with high impact resistance.

Simple mechanical blending may be employed for the incorporation of a rubbery polymer into styrene polymer. The use of a graft copolymer is more desirable in order to obtain a better mutual solubility of the components. Such a graft copolymer is prepared by graft-copolymerizing a rubbery polymer with an aromatic vinyl compound, or with a mixture of an aromatic vinyl compound and other type of vinyl compound. The product obtained by a graft-blending method, in which a graft-polymerized rubber-modified styrene polymer is blended with a styrene-containing polymer which has been separately prepared, can also be used.

Rubber-type polymers which can be used in this invention include polybutadiene, styrene-butadiene copolymer, acryl-containing copolymer, ethylene-propylene copolymer, chlorinated polyethylene, polyurethane, and the like. Among these, an especially preferable rubbery polymer is polybutadiene.

It is desirable that at least 50%, more preferably at least 70%, of the particles of the rubber components in the rubber-modified styrene thermoplastic resin have a particle size in the range of 1,200–2,500 angstroms. The products with rubber components with this particle size range exhibit especially outstanding painting performance and impact resistance.

Given as examples of aromatic vinyl compounds are styrene, bromostyrene, p-methylstyrene, α-methylstyrene, and the like. Among these, a preferable aromatic vinyl compound is styrene. α-Methylstyrene can be used, but use of α-methylstyrene according to the present invention is limited to less than 10% by weight, based on the weight of rubber-modified styrene thermoplastic resin, because such amounts in accordance with this invention provide improved impact resistance, increased melt flow rate, and better molding heat stability in comparison to compositions which include 10% or more α-methylstyrene. In addition and most importantly, the incorporation of no α-methylstyrene or less than 10% by weight of α-methylstyrene provides improved painted surfaces of the product. Therefore, component A does not contain α-methylstyrene in an amount equal to or greater than 10% by weight. Most preferably, component A contains substantially no α-methylstyrene.

Copolymerizable monomers other than aromatic vinyl compounds include cyanized vinyl compounds such as acrylonitrile and methacrylonitrile; methylmethacrylate, N-phenylmaleimide, N-cyclohexylmaleimide, maleic anhydride, methacrylic acid, and the like.

Since impact resistance, in general, is promoted to a lesser extent by mere copolymerization of an aromatic vinyl compound with a rubber-modified styrene thermoplastic resin, copolymerization of a cyanized vinyl compound is more preferable. In this instance, a preferable proportion of an aromatic vinyl compound and a cyanized vinyl compound, in terms of % by weight, is in the range of 60-90/10-40, with a particularly preferable range being 65-85/15-35.

Specific examples of the rubber-modified styrene thermoplastic resins meeting these requirements include conventional acrylonitrile-butadiene-styrene resin (ABS resin), acrylonitrile-ethylenepropylene-styrene resin (AES resin), methylmethacrylate-butadiene-styrene resin (MBS resin), acrylonitrile-butadiene-methylmethacrylate-styrene resin (transparent ABS resin), rubber-modified polystyrene (high-impact polystyrene: HIPS), and the like.

The content of rubber in the rubber-modified styrene thermoplastic resin is preferably 5-40% by weight, and particularly preferably 10-30% by weight.

It is desirable that the methyl ethyl ketone soluble component in the rubber-modified styrene thermoplastic resin have an intrinsic viscosity ($[\eta]_{MEK}{}^{30°C}$, unit: dl/g) measured in methyl ethyl ketone at 30° C. in the range of 0.2 to 1.2, preferably 0.2 to 1.0, and most preferably 0.3 to 0.9 dl/g.

The rubber component graft ratio of the graft polymer in the rubber-modified styrene thermoplastic resin measured by solvent fractionation using acetone or the like is preferably 10-150%, and particularly preferably 20-100%.

(B) Aromatic polyester:

An example of aromatic polyesters is a condensation product produced by condensation of an aromatic dicarboxylic acid, its ester, or its ester-forming derivative and a diol compound.

Aromatic dicarboxylic acids used in the preparation of such an aromatic polyester include, for example, naphthalene dicarboxylic acids, e.g., naphthalene-2,6-dicarboxylic acid; terephthalic acid, isophthalic acid, p-hydroxybenzoic acid, adipic acid, and sebasic acid, as well as their ester-forming derivatives.

Examples of diols include polymethylene glycol having 2-6 carbon atoms, e.g., ethylene glycol, 1,4-butanediol, 1,6-hexanediol; 1,4-cyclohexanediol, bisphenol A, and the like, as well as their ester-forming derivatives.

Specific examples of aromatic polyesters meeting these requirements are polyethylene terephthalate (PET), polybutylene terephthalate (PBT), bisphenol A isophthalate, and the like. Among these, polybutylene terephthalate (PBT) is a preferable aromatic polyester.

An intrinsic viscosity of these aromatic polyesters in o-chlorophenol at 25° C. ($[\eta]_{o\text{-}chlorophenol}{}^{25°C}$, unit: dl/g) is in the range of 0.2-1.5, preferably 0.25-1.0, especially preferably 0.3-0.9, and most preferably 0.35-0.8. If the intrinsic viscosity is less than 0.2, the improvement in the painted surface appearance of the resulting resin composition is not as excellent; if more than 1.5, the resin composition does not exhibit as much of an improvement in painted surface appearance and fluidity as is achieved according to the present invention.

(C) Aromatic polycarbonate:

As aromatic polycarbonates which may be used in the rubber-modified styrene thermoplastic resin composition of this invention, 4,4'-dihydroxydiphenylalkane-type polycarbonates are particularly preferable. More particularly, preferable polycarbonates are those prepared by an ester exchange or the phosgene method using 2,2-(4,4'-dihydroxydiphenyl)-propane (hereinafter referred to as "bisphenol A"), as a dihydroxy component. Compounds prepared by substituting a part or whole of bisphenol A with other types of 4,4'-dihydroxydiphenylalkane or 4,4'-dihydroxydiphenylether are also preferable.

Among these aromatic polycarbonates, those having a weight average molecular weight ($M_w$) measured by the photo-diffusion method in the range of 10,000 to 80,000 are preferable, with a particularly preferable $M_w$ being in the range of 10,000 to 50,000.

The rubber-modified styrene thermoplastic resin composition of this invention is prepared by blending (A) rubber-modified styrene thermoplastic resin, (B) aromatic polyester, and (C) aromatic polycarbonate. The method for the preparation of this resin will be discussed in more detail.

The rubber-modified styrene thermoplastic resin is compounded in an amount of 75 to 99.8% by weight, preferably 3 to 99.6% by weight, more preferably 87 to 99.4% by weight, and most preferably 93 to 99% by weight, into the composition. If the amount of this component is less than 75% by weight, a further improvement in the external appearance of the painted surface obtained according to the present invention cannot be expected in proportion to the amount of an aromatic polyester. In addition, the fluidity of the resin composition is impaired. An amount exceeding 99.8% by weight does not provide the excellent external appearance of the painted surface achieved according to the present invention.

The aromatic polyester is compounded in an amount of 0.1 to 15% by weight, preferably 0.2 to 10% by weight, more preferably 0.3 to 8% by weight, and most preferably 0.5 to 5% by weight, into the composition of the present invention. If this amount is less than 0.1% by weight, the excellent external appearance of the painted surface obtained according to the present invention is not achieved, while, on the other hand, the superior external appearance of the painted surface achieved according to the present invention is not obtained at an amount exceeding 15% by weight, nor is the excellent fluidity of the paint.

The aromatic polycarbonate is compounded in an amount of 0.1 to 10% by weight, preferably 0.2 to 7% by weight, more preferably 0.3 to 5% by weight, and most preferably 0.5 to 2% by weight, into the composition. If this amount is less than 0.1% by weight, the resulting composition does not have the excellent impact resistance achieved according to the present invention; if more than 10% by weight, the superior external appearance of the painted surfaces achieved according to the present invention is not obtained.

Various methods as well as various blending machines conventionally used in the blending or mixing of thermoplastic resins can be employed for blending the rubber-modified styrene thermoplastic resin, aromatic polyester, and aromatic polycarbonate. Such blending machines include, for example, Banbury mixer, Brabender, Plasto-mill, a kneader, or an extruder with a vent. Among these, the use of an extruder with a vent is especially desirable.

There are no specific limitations to the form of the resins before blending. Any forms, including pellets, beads, powder, flake, or the like are acceptable. The blending temperature should be higher than the melting point of the aromatic polyester to be blended. However, since the rubber-modified styrene thermoplastic resin is thermally unstable at a temperature above 300° C., a blending temperature of between 230° and 300° C. is desirable.

The preparation of the rubber-modified styrene thermoplastic resin by graft-blending method is advantageous, since it ensures the blending of the 4 components, i.e., graft polymer, styrene-containing polymer, aromatic polyester, and aromatic polycarbonate, at the same time.

In addition to the above-mentioned essential components, various types of other components and additives can optionally be added to the resin composition of the present invention. Such other components and additives may include, for example, lubricants, antistatic agents, antioxidants, flame retardants, ultraviolet ray absorbing agents, photo-oxidation inhibitors, coloring agents, inorganic fillers (e.g. glass fiber), and the like.

Other features of the invention will become apparent in the course of the following description of the exemplary embodiments which are given for illustration of the invention and are not intended to be limiting thereof.

EXAMPLES

In the examples below, all the designation of "part(s)" denotes "parts by weight".

The following thermoplastic resins were used in the examples:

(A) Rubber-modified styrene thermoplastic resin

ABS Resin 1: A graft polymer obtained by the graft polymerization of 40 parts of polybutadiene rubber, 45 parts of styrene, and 15 parts of acrylonitrile, at a graft ratio of 50%; $[\eta]=0.5$; 90% of rubber particles having a particle size in the range of 1,500–2,000 angstroms.

ABS Resin 2: A graft polymer obtained by the graft polymerization of 40 parts of polybutadiene rubber, 40 parts of styrene, and 20 parts of acrylonitrile, at a graft ratio of 50%; $[\eta]=0.5$; 90% of rubber particles having a particle size in the range of 1,500–2,000 angstroms.

ABS Resin 3: A graft polymer obtained by the graft polymerization of 20 parts of polybutadiene rubber, 36 parts of styrene, 24 parts of acrylonitrile, and 20 parts of α-methylstyrene at a graft ratio of 60%; $[\eta]=0.5$; 90% of rubber particles having a particle size in the range of 1,500–2,000 angstroms.

AS Resin 1: An AS resin composed of 75 parts of styrene and 25 parts of acrylonitrile. $[\eta]=0.55$ AS Resin 2: An AS resin composed of 65 parts of styrene and 35 parts of acrylonitrile. $[\eta]=0.55$ (B) Aromatic polyester:

PBT Resin 1: $[\eta]=0.9$, manufactured by Polyplastic Co. Ltd.

PBT Resin 2: $[\eta]=0.5$, manufactured by Polyplastic Co. Ltd.

PBT Resin 3: $[\eta]=2.0$, manufactured by Polyplastic Co. Ltd.

PET Resin 4: $[\eta]=0.65$, manufactured by Allied Signal Co.

PET Resin 5: $[\eta]=0.1$ (C) Aromatic polycarbonate:

PC Resin: $M_w=25,900$, manufactured by Idemitsu Petrochemical Co., Ltd.

Examples 1–12, Comparative Examples 1–13

Thermoplastic resins listed in Tables 1-1 and 1-2 were mixed at a proportion shown in the same tables using a Henschel mixer. The mixture was granulated by an extruder at 210–240°C. The granules were dried at 90° C. and injection-molded at 200° C. The izod impact strength, melt-flow rate, molding heat stability of the compositions, and the external appearance of the painted surfaces were evaluated.

The evaluation and measurement of these characteristics were carried out according to the following methods:

(1) Izod impact strength: ASTM D256 (6 mm thickness, with a notch)

(2) Melt-flow rate: ASTM D1238 (220° C., 10 kg)

(3) Painted surface appearance:

High Urethane No. 5000 (trademark, a product of Japan Oil and Fat Co., Ltd.) was applied onto the surfaces of the molded articles. The surface appearance was visually observed and evaluated according to the following criteria.

AAA: Very good

BBB: Suction or crazing were observed

CCC: Suction or crazing were remarkable (4) Molding heat stability:

The resin compositions were molded by injection at 280° C. Colors of molded resin articles continuously injected and those injected after having been kept in the cylinder at 280° C. for 15 minutes were compared. The color differences were taken as a measure of the molding heat stability.

The results are shown in Tables 1—1 and 1-2.

TABLE 1-1

| Components of Thermoplastic Resin Composition (Parts by weight) | | Example | | | | | Comparative Example | | | | | |
|---|---|---|---|---|---|---|---|---|---|---|---|---|
| | | 1 | 2 | 3 | 4 | 5 | 1 | 2 | 3 | 4 | 5 | 6 |
| (A) | Rubber-modified Styrene Thermoplastic Resin | | | | | | | | | | | |
| | ABS Resin 1 | 50 | 50 | 50 | 50 | 50 | 50 | — | 50 | 50 | 50 | 50 |
| | ABS Resin 2 | — | — | — | — | — | — | 50 | — | — | — | — |
| | AS Resin 1 | 42 | 37 | — | — | — | 50 | — | 27 | 40 | 33 | 39 |
| | AS Resin 2 | — | — | 47 | 42 | 45 | — | 50 | — | — | — | — |
| (B) | Aromatic Polyester | | | | | | | | | | | |
| | PBT Resin 1 | 5 | 10 | — | 5 | — | — | — | 20 | 10 | — | — |
| | PBT Resin 2 | — | — | 2 | — | 3 | — | — | — | — | 2 | — |
| | PBT Resin 3 | — | — | — | — | — | — | — | — | — | — | 8 |
| (C) | Aromatic Polycarbonate PC Resin | 3 | 3 | 1 | 3 | 2 | — | — | 3 | 0 | 15 | 3 |
| Characteristics | | | | | | | | | | | | |
| Izod Impact Strength | | 26 | 28 | 25 | 26 | 27 | 27 | 29 | 25 | 19 | 26 | 27 |
| Melt-flow Rate | | 16 | 13 | 13 | 13 | 14 | 17 | 8 | 8 | 12 | 10 | 7 |
| Painted Surface Appearance | | AAA | AAA | AAA | AAA | AAA | CCC | BBB | AAA | BBB | CCC | CCC |
| Molding Heat Stability | | 7.5 | 7.7 | 9.8 | 10.2 | 9.5 | 7.5 | 16.5 | 14.0 | 7.8 | 7.9 | 7.5 |

TABLE 1-2

| Components of Thermoplastic Resin Composition (Parts by weight) | Example | | | | | | | Comparative Example | | | | | | |
|---|---|---|---|---|---|---|---|---|---|---|---|---|---|---|
| | 6 | 7 | 8 | 9 | 10 | 11 | 12 | 7 | 8 | 9 | 10 | 11 | 12 | 13 |
| (A) Rubber-modified Styrene Thermoplastic Resin | | | | | | | | | | | | | | |
| ABS Resin 1 | 40 | 30 | 60 | 40 | 50 | 50 | 50 | 40 | 60 | 40 | 40 | 50 | — | — |
| ABS Resin 2 | — | — | — | — | — | — | — | — | — | — | — | — | — | — |
| ABS Resin 3 | — | — | — | — | — | — | — | — | — | — | — | — | 94.5 | 87 |
| AS Resin 1 | 53 | 63 | 29 | — | 37 | — | — | 55 | — | 18 | 35 | 44 | — | — |
| AS Resin 2 | — | — | — | 53 | — | 44.5 | 44.5 | — | 37 | — | — | — | — | — |
| (B) Aromatic Polyester | | | | | | | | | | | | | | |
| PBT Resin 1 | — | — | — | — | — | 3 | — | — | — | — | — | — | — | — |
| PBT Resin 2 | 5 | 5 | 8 | — | — | — | 4 | — | — | 30 | 5 | — | 4 | 10 |
| PET Resin 4 | — | — | — | 5 | 10 | — | — | — | — | — | — | — | — | — |
| PET Resin 5 | — | — | — | — | — | — | — | — | — | — | — | 3 | — | — |
| (C) Aromatic Polycarbonate PC Resin | 2 | 2 | 3 | 2 | 3 | 1.5 | 1.5 | 5 | 3 | 12 | 20 | 3 | 1.5 | 3 |
| Characteristics | | | | | | | | | | | | | | |
| Izod Impact Strength | 18 | 14 | 33 | 20 | 26 | 27 | 25 | 20 | 35 | 20 | 25 | 25 | 16 | 15 |
| Melt-flow Rate | 22 | 30 | 12 | 18 | 10 | 17 | 18 | 21 | 10 | 5 | 8 | 18 | 10 | 8 |
| Painted Surface Appearance | AAA | AAA | AAA | AAA | AAA | AAA | AAA | CCC | CCC | BBB | CCC | CCC | BBB | BBB |
| Molding Heat Stability | 7.0 | 6.5 | 8.0 | 7.2 | 7.5 | 7.9 | 7.7 | 7.3 | 8.2 | 14.0 | 8.5 | 7.5 | 17.5 | 15.0 |

The following conclusions can be derived from the results shown in Tables 1—1 and 1-2.

The data of Examples 1–12 clearly indicate that the compositions of the present invention produce excellent painted surfaces, while maintaining superior izod impact strength, good fluidity, and superb molding heat stability.

The composition of Comparative Example 1, which includes only a conventional ABS resin, produced an extremely poor painted surface.

The composition of Comparative Example 2, which represents a conventional ABS resin in which painted surface improvement was intended by increasing the amount of acrylonitrile to be incorporated, produced only an insufficient painted surface. The composition exhibited remarkably impaired fluidity and molding surface stability.

The composition of Comparative Example 3, in which an aromatic polyester was incorporated in an amount (20 parts) greater than the amount required by the present invention, exhibited remarkably impaired fluidity and molding surface stability.

The composition of Comparative Example 4 represents a composition without incorporation of an aromatic polycarbonate. Not only the izod impact strength of the composition was very poor, but also it produced an inadequate painted surface.

The composition of Comparative Example 5, in which an aromatic polycarbonate was incorporated in an amount (15 parts) greater than the amount required by the present invention, produced a very poor painted surface.

The composition of Comparative Example 6 represents a composition containing an aromatic polyester with an intrinsic viscosity outside the scope defined by the present invention produced a painted surface which was only insufficiently improved. In addition, moldability of the resin composition was poor.

The composition of Comparative Examples 7 and 8 represent compositions without component (B) of the present invention. Their capability of producing an excellent painted surface was poor.

The composition of Comparative Example 9 represents a composition with component (B) being incorporated in an amount more than the amount required by the present invention. It produced a poor painted surface and exhibited impaired molding heat stability.

The composition of Comparative Example 10 contained component (C) in an amount more than the amount required by the present invention. It produced a poor painted surface and its melt-flow characteristic was inadequate.

The composition of Comparative Example 11 represents a product using component (B) with an intrinsic viscosity outside the defined range. It could not produce a good looking painted surface when a paint was coated on its surface.

The composition of Comparative Example 12 represents a product containing 20% by weight of α-methylstyrene in component (A). The product exhibited poor impact resistance and low melt flow rate. Its molding heat stability was inadequate. In addition, the appearance of the painted surface was unacceptable.

As illustrated above and demonstrated by the examples, the thermoplastic resin composition of the present invention in which small amounts of a specific aromatic polyester and a specific aromatic polycarbonate are incorporated provides a painted surface with a superior appearance when a paint is applied on its surface, while maintaining its excellent fluidity, impact resistance, and molding heat stability. The composition is thus very useful in industries.

Obviously, numerous modifications and variations of the present invention are possible in light of the above teachings. It is therefore to be understood that within the scope of the appended claims, the invention may be practiced otherwise than as specifically described herein.

What is claimed is:

1. A thermoplastic resin composition comprising:
  (A) 93 to 99% by weight of an aromatic vinyl compound grafted to a rubber selected from the group consisting of polybutadiene, styrene-butadiene copolymer, acryl-containing copolymer, ethylene-propylene copolymer, chlorinated polyethylene, and polyurethane, (B) 0.5 to 5% by weight of an aromatic polyester selected from the group consisting of polyethylene terephthalate, polybutylene terephthalate and bisphenol A isophthalate, and
(C) 0.5 to 2% by weight of an aromatic polycarbonate, the composition containing no α-methylstyrene of less than 10% by weight of α-methylstyrene based on the amount of said rubber-modified styrene thermoplastic resin.

* * * * *